United States Patent [19]

Nakada et al.

[11] Patent Number: 5,005,121
[45] Date of Patent: Apr. 2, 1991

[54] INTEGRATED CPU AND DMA WITH SHARED EXECUTING UNIT

[75] Inventors: Kunihiko Nakada, Kodaira; Yasushi Akao, Kokubunji, both of Japan

[73] Assignee: Hitachi, Ltd., Tokyo, Japan

[21] Appl. No.: 326,472

[22] Filed: Mar. 20, 1989

Related U.S. Application Data

[63] Continuation of Ser. No. 836,421, Mar. 5, 1986, abandoned.

[30] Foreign Application Priority Data

Mar. 25, 1985 [JP] Japan .............................. 60-58350

[51] Int. Cl.⁵ .................. G06F 9/22; G06F 15/78; G06F 12/00
[52] U.S. Cl. ............................ 364/200; 364/242.3; 364/249; 364/249.2; 364/239.5; 364/244.6; 364/238; 364/238.1; 364/240; 364/242.31
[58] Field of Search ... 364/200 MS File, 900 MS File

[56] References Cited

U.S. PATENT DOCUMENTS

| | | | |
|---|---|---|---|
| 4,180,938 | 1/1980 | Suzuki | 364/200 |
| 4,181,938 | 1/1980 | Suzuki et al. | 364/200 |
| 4,339,793 | 7/1982 | Marenin | 364/200 |
| 4,348,720 | 9/1982 | Blahut et al. | 364/200 |
| 4,449,202 | 5/1984 | Knapp et al. | 364/900 |
| 4,451,884 | 5/1984 | Heath et al. | 364/200 |
| 4,458,313 | 7/1984 | Suzuki et al. | 364/200 |
| 4,467,420 | 8/1984 | Murakami | 364/200 |
| 4,558,412 | 12/1985 | Inoshita | 364/200 |
| 4,688,166 | 8/1987 | Schneider | 364/200 |
| 4,731,736 | 3/1988 | Mothersole et al. | 364/900 |

OTHER PUBLICATIONS

*Computer Design* vol. 15 No. 8, Aug. 1976, "Hardware Versus Software for Microprocessor I/O", pp. 102–107, J. L. Nichols.
"*Nikkei Electronics*", No. 296 pp. 129–158 Direct Memory Access Controller, Nikkei McGraw-Hill. C.C. Aug. 1982.

*Primary Examiner*—Thomas C. Lee
*Assistant Examiner*—Eric Coleman
*Attorney, Agent, or Firm*—Fay, Sharpe, Beall, Fagan, Minnich & McKee

[57] ABSTRACT

A data processor controller for a microprogramming system is constructed with a single operation execution unit serving both a microprocessor and a peripheral device such as a direct memory access controller. In addition to the single operation execution unit, the controller includes a micro-memory which stores micro-instructions for controlling both the microprocessor and the peripheral device, and address registers, multiplexers and decoders integrated into a single device. Different ROM address registers in the controller are separately assigned to provide an address decoder with addresses of selected memory locations in the micro-memory containing the micro-instructions for the microprocessor and the peripheral device, thereby enabling the controller, through multiplexing between the address registers, to use the arithmetic execution unit, counter and bus interface of the single operation exeuction unit on a time sharing basis, for controlling the functions of both the microprocessor and the peripheral device.

29 Claims, 7 Drawing Sheets

INTEGRATED CPU AND DMA WITH SHARED EXECUTING UNIT

This application is a continuation of application Ser. No. 836,421 filed Mar. 5, 1986 now abandoned.

TECHNICAL FIELD

This invention relates to data processing and data processor controllers, and more particularly, to microcomputer systems and processes for operating microcomputer systems, and to microprocessors for microprogram systems.

BACKGROUND ART

Often in a microcomputer system, a large amount of data needs to be transmitted between data input/output equipment such as a CRT terminal, a hard disk or a floppy disk, and a memory, and between memories. When a microprocessor is charged with such data transmission by the software, the load on the microprocessor is greatly increased; consequently, the effective capacity of the system decreases.

To cope with this disadvantage, a DMA (direct memory access) controller has been furnished as one item of equipment for controlling data transmission between component elements of the microcomputer. However, since a conventional DMA controller is an LSI (Large-sized integrated circuit) formed separately from the microprocessor, the use of a conventional DMA controller is disadvantageous in that it complicates the construction of a system for DMA transmission. That is, it becomes necessary to mount the microprocessor LSI as well as the DMA controller LSI on a printed wiring board. Further, it is often required to provide a suitable logic IC such as TTL to form an interface between the microprocessor and the DMA controller. This fact causes the construction of board such as wiring substrate to become complex.

The present inventors thought about simplifying the construction of the system by incorporating the function of a DMA controller in a microprocessor LSI. The mere incorporation of the DMA controller in the conventional microprocessor however, markedly increases the chip size of an LSI, thereby creating a possibility of lowering the production yield.

One DMA controller, and the microcomputer system in which that controller is used, are described in the Aug. 2, 1982, issue of "Nikkei Electronics", published by Nikkei McGraw-Hill, No. 296, pp. 129 to 158.

SUMMARY OF THE INVENTION

It is an object of this invention to provide an improved data processor.

Another object of this invention is to improve the function of a microprocessor without greatly increasing the chip size, and thereby to facilitate the construction of a microcomputer system.

It is also an object of this invention to provide a data processor controller having a single integrated operation execution unit for both a microprocessor and a separable peripheral device.

Typical features of the invention disclosed in the present application will be summarized in the following discussion.

Based on the mutual similarity in the construction of the arithmetic execution elements of a microprocessor and a DMA controller, the present invention uses a common arithmetic execution element for the microprocessor and the DMA controller, while adopting a microprogram system as a system for controlling said two devices and thereby integrating a microprogram ROM in one. By this constitution, duplication in a circuitry can be eliminated, and thereby, a highly functional microprocessor having an additional function as a DMA controller, a function which no conventional microprocessors have, can be constructed without an increase in the chip size.

BRIEF DESCRIPTION OF THE DRAWINGS

The above and other objects and novel characteristics of this invention will be apparent from the description of the present specification and the drawings annexed thereto, wherein.

DETAILED DESCRIPTION OF THE INVENTION

Figure 1:
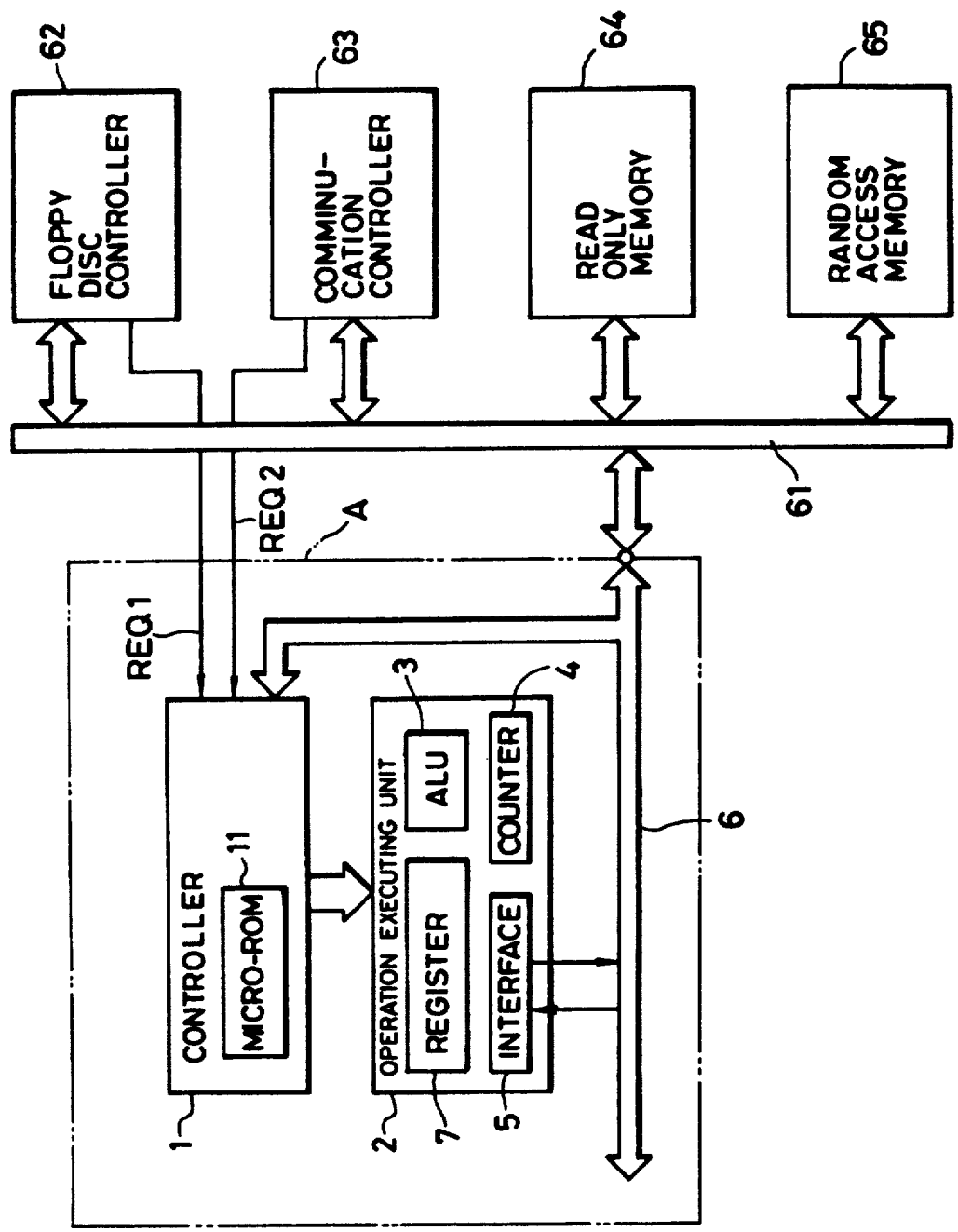
FIG. 1 shows a schematic construction of an entire LSI in the case when the present invention is adapted to a microprocessor.

FIG. 1 shows schematically a construction of a microprocessor (hereinafter called a CPU) having the function of a DMA controller, to which the present invention is adapted. The part surrounded by a chain line A in the figure is monolithically formed on one integrated semiconductor chip such as a single-crystal silicon substrate.

This embodiment is designed to take advantage of the following similarities of CPU and the DMA controllers. A DMA controller has, like the CPU, an ALU (arithmetic logic unit) and a counter such as an incrementor or a decrementor for computing a sending-device address and a receiving-device address required for DMA transmission, and for counting the number of transmitted words, respectively. Moreover, both a CPU and a DMA controller are provided with an interface circuit with an address bus and a data bus respectively for providing computed addresses and data to an internal bus and receiving necessary signals from outside. Based on these similarities, an operation execution unit such as arithmetic execution unit 2 is provided to be used commonly by the CPU and the DMA controller, and ALU 3, a counter 4 and a bus interface circuit 5 in the arithmetic execution unit 2 are designed to be used commonly thereby. According to this construction, the respective operations are executed by using the same ALU 3 and counter 4 in a time-sharing manner, while address signals and data signals are interchanged between the common bus interface circuit 5 and an internal bus 6.

A register 7 in the arithmetic execution unit 2 must be provided separately for the CPU and the DMA controller because of the difference in the thereof for each of them. If a general purpose register is employed, however, it can be used commonly both for the CPU and the DMA controller.

Moreover, in this embodiment, a microprogram control system of simple, logical design and modification is adopted for use as a control system for control elements of the CPU and the DMA controller; furthermore, the control element of the CPU and that of the DMA controller are monolithically integrated into one unit to increase efficiency.

The internal bus 6 of the LSI A is coupled to suitable external equipment via an external bus 61. In the apparatus of FIG. 1, the external bus 61 is coupled to a floppy disk controller 62, a communication controller 63, a ROM (read-only memory) 64, and to a RAM random access memory) 65.

Onto the ROM 64 have been written a macro-instruction that will be executed by the microprocessor, and a control data or fixed data that will be referred to when the macro-instruction is to be executed.

Onto the RAM 65 are written data that are supplied, for example, from the floppy disk controller 62 and the communication controller 63, data that are to be supplied to these controllers 62, 63, and suitable instructions.

The control unit 1 receives DMA transmission request signals REQ 1, REQ 2 from the controllers 62, 63.

The control unit 1 fundamentally operates as described below. The construction and operation of the control unit 1 will be explained later with reference to FIG. 2.

The macro-instruction read out from the ROM 64 in the macro-instruction fetch operation is supplied to the control unit 1 via the external bus 61 and the internal bus 6. Responsive to the macro-instruction that is supplied, a start address of the micro ROM 11 in the control unit is set, and a micro-instruction is read out from the micro ROM 11. The arithmetic execution unit 2 is controlled by the micro-instruction. The micro ROM 11 produces a next address data which indicates a micro-instruction that is to be read out from the micro ROM in the next step. Therefore, micro-instructions are successively read out from the micro ROM 11 at timings determined by signals such as system clock signals, and the arithmetic execution unit 2 is controlled successively by the micro-instructions. Thus, a plurality of micro-instructions are read out for each macro-instruction, and the microprocessor executes its operation.

When a DMA transmission request signal REQ 1 or REQ 2 is produced from external equipment such as floppy disk controller 62, a start address data for processing the DMA transmission is formed for the micro ROM 11 depending upon the DMA transmission request signal. Responsive thereto, a series of micro-instructions for the DMA transmission are read out from the micro ROM. Therefore, the DMA transmission processing is executed. After the DMA transmission is processed, the microprocessor operation is operated again.

Figure 2:
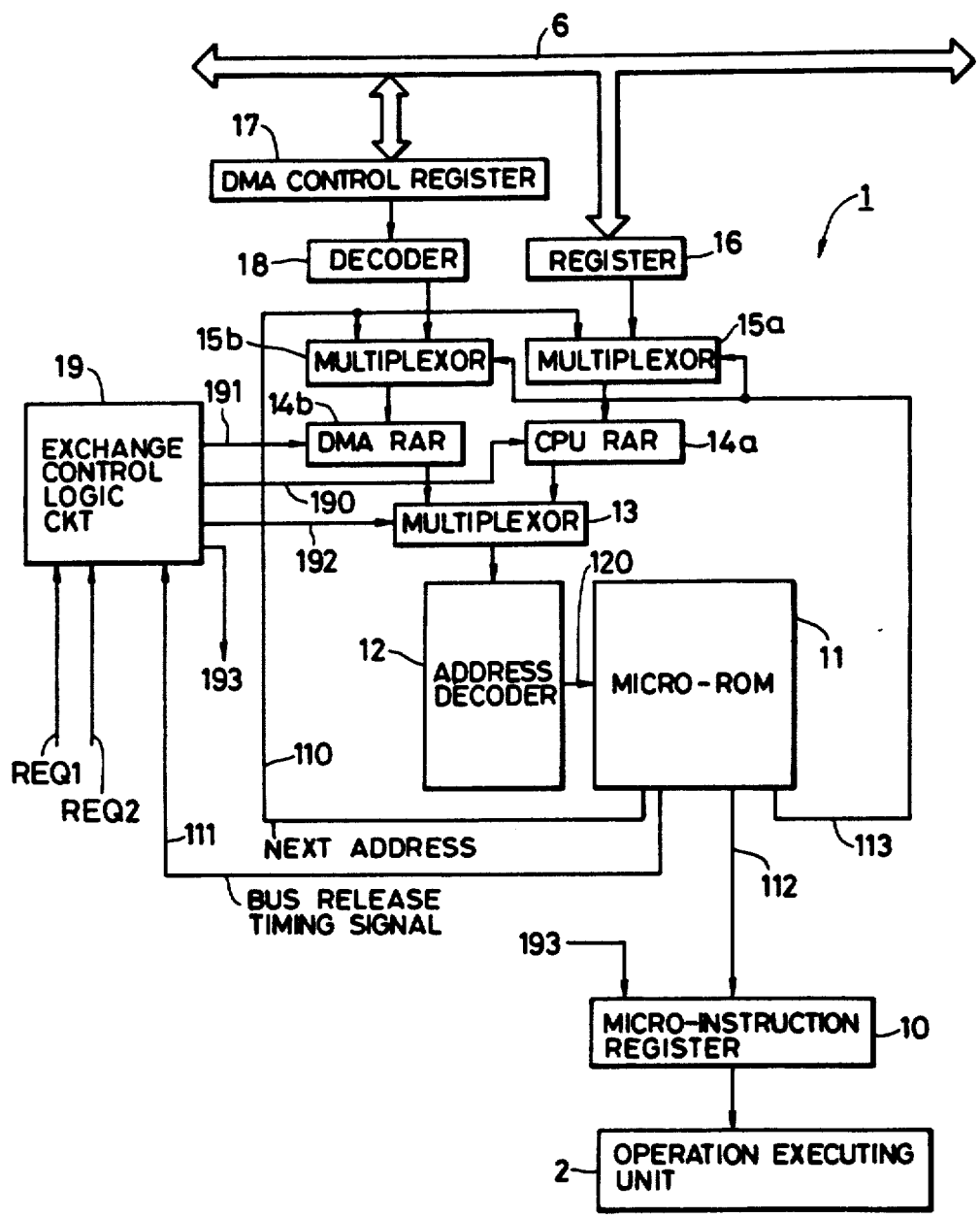
FIG. 2 is a block diagram showing one embodiment of the construction of the control unit of said LSI.

FIG. 2 shows one embodiment of a particular configuration of a control unit 1 of FIG. 1 which is integrated described above.

In this embodiment, a microprogram relating to the operation of the CPU and a microprogram relating to the operation of the DMA controller are stored in a microprogram ROM 11 (hereinafter called a micro ROM) which is used commonly for these two devices. Moreover, registers for holding an address for reading out a micro-instruction relating to the operation of the CPU and an address for reading out a micro-instruction relating to the operation of the DMA controller are provided separately as a DMA ROM address register (DMA RAR) 14b and a CPU ROM address register (CPU RAR) 14a.

Addresses held by ROM address registers 14a and 14b are supplied selectively by a multiplexer 13 to an address decoder 12, whereby a micro-instruction corresponding to the supplied address is read out. Part of the micro-instruction thus read out is held by a micro-instruction register 10 and then supplied as a microprogram control signal to the arithmetic execution unit 2, without being processed or being decoded. The micro-instruction also contains a next address for reading out a subsequent micro-instruction, and this next address is supplied to multiplexers 15a and 15b, multiplexed with a start address to be described later, and then held by ROM address registers 14a and 14b.

The ROM address registers 14a and 14b are provided separately because an address of a CPU micro-instruction required for a subsequent operation must be held so as to resume a discontinued CPU operation after the completion of DMA transmission which is conducted on the basis of a demand therefor delivered during the course of the operation of the CPU.

This control unit 1 is further provided with an instruction register 16 holding a macro-instruction to the CPU, a DMA control register 17 setting a transmission mode of the DMA controller, and a decoder 18 decoding an output signal of said DMA control register 17 to form a start address.

According to this embodiment, a macro-instruction read from a ROM 64 or the like provided outside the chip, is held by instruction register 16, and then the operation code of said macro-instruction is supplied to the CPU ROM address register 14a through the multiplexer 15a and further supplied selectively to the address decoder 12 by a multiplexer 13. Then, a corresponding word line in the micro ROM 11 is accessed by the address decoder 12, and thereby a first micro-instruction is read out. Subsequently, a next address contained in the read micro-instruction is supplied to the CPU ROM address register 14a through the multiplexer 15a. A series of micro-instructions are read out sequentially in this way to form a control signal, which is supplied to the arithmetic execution unit to execute one macro-instruction.

Figure 4:
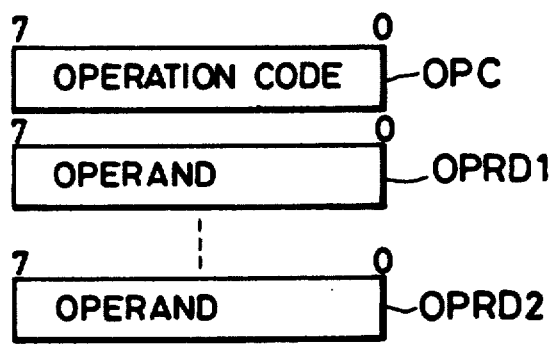
FIG. 4 is a diagram showing the construction of micro-instruction.

FIG. 4 shows one example of a construction of the macro-instruction. Though there is no particular limitation, the macro-instruction comprises of a byte of operation code OPC and a subsequent plurality of bytes of operands OPRD 1 to OPRD 2. The number of operands is determined depending upon the operation code OPC. When the operation code OPC consists of one byte, i.e., consists of eight bits, the number of start addresses of the micro ROM 11 that can be set by the macro-instruction becomes a maximum of 256.

Figure 5:
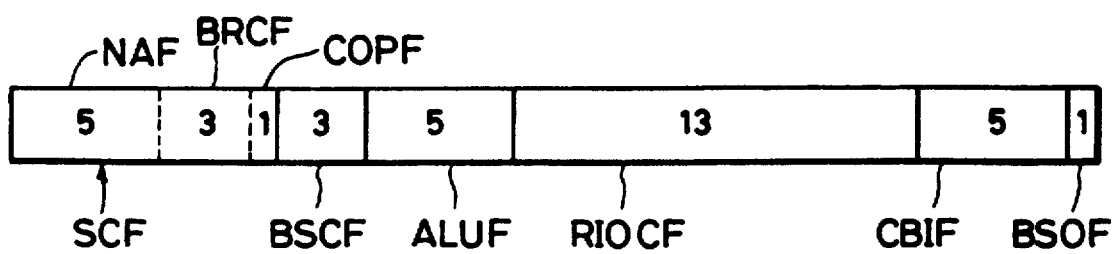
FIG. 5 is a diagram showing the construction of micro-instruction.

FIG. 5 shows a construction of bits of micro-instruction read out from the micro ROM 11.

Though there is no particular limitation, the micro-instruction is comprised of a sequence control field SCF comprising such as nine bits, a bus control field BSCF comprising such as three bits for controlling the internal bus and for controlling buses 20, 21 that will be explained later with reference to FIG. 7, an ALU operation designation field ALUF comprising such as five bits for controlling the ALU operation in the arithmetic execution unit 1, a register input/output designation field RIOCF comprising such as 13 bits for controlling the input and output of various internal registers, conditional branch and flag change designation field CBIF comprising such as five bits for controlling the conditional branch and for controlling the flag that will be described later, and a control field BSOF comprising such as one bit for designating a bus right open timing.

The sequence control field SCF comprises a control field COPF of one bit, and a next address field of a total of eight bits consisting of, for example, a first field NAF and an operation code branch field BRCF.

Figure 6:
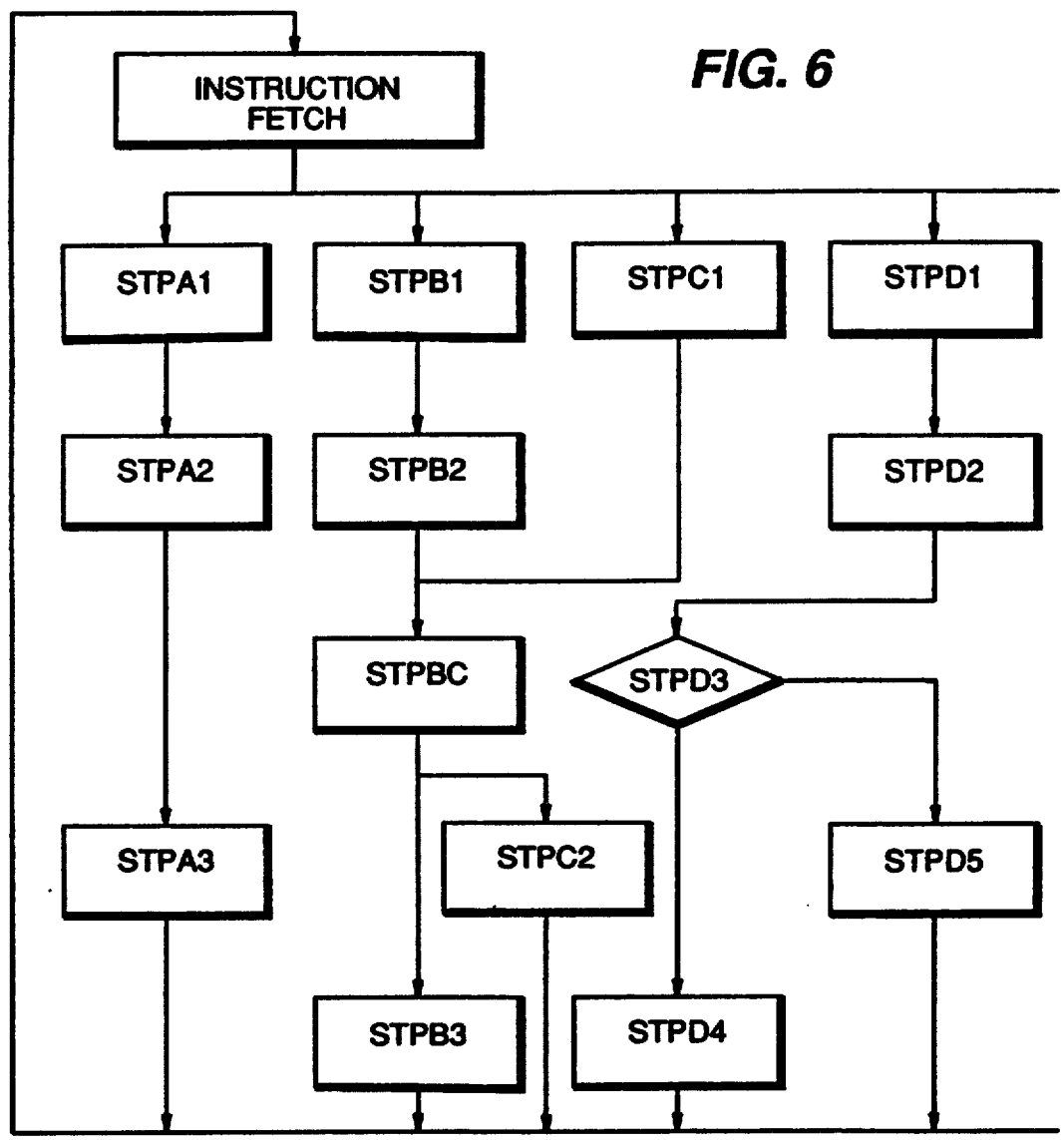
FIG. 6 is a flow chart of micro-instruction.

FIG. 6 is a flow chart of a microprogram.

In a first step STP00, an operation code OPC in the macro-instruction is fetched to the instruction register 16 of FIG. 2.

The operation code OPC fetched to the instruction register 16 is supplied to the address decoder 12 via multiplexer 15a, address register 14a and multiplexer 13, whereby a start address of the micro ROM 11 is designated. Namely, one of a plurality of microprocessing flows is designated.

If the start address indicates a processing step STPA 1, a micro-instruction which corresponds to the step is read out from the ROM 11. A processing step STPA 2 is designated by a next address that is designated by the step STPA 1. In the same manner, the processing steps are designated successively. After the processing is executed in a final processing step STPA 3 in a process flow, the process (step STP00) of macro-instruction fetch is performed again.

According to this embodiment, the microprocesses which are equal to each other are commonly executed in the individual microprocess flows. In FIG. 6, the processing step STPBC represents such processing steps that are performed in common. That is, the microprocess STBC is commonly utilized for each of the microprocess flow which consists of microprocesses STPB 1 to STPB 3, and the microprocess flow which consists of STPC 1 to STPC 2.

Though there is no particular limitation, the next address that is to be designated after the common microprocess STPBC is executed, is formed as described below.

That is, in the common microprocess STPBC, bits of operation code branch field may assume such values as "0", "0", "1" in the micro-instructions produced from the micro ROM 11, and a bit in the control field COPF may assume a level such as "1". The level "1" of the control field COPF means to utilize the macro-instruction.

When the control field COPF assumes "1", the multiplexer 15a is so controlled as the select three bits of the field BRCF together with the macro-instruction consisting of eight bits produced from the instruction register 16. Therefore, the address register 14a is served with the macro-instruction to which the above-mentioned three bits have been added. The thus added three bits are regarded to form a page data. The macro-instruction modified by the additional three bits is regarded to designate a next address that is designated after a common microprocess such as STPB 2 is executed.

Therefore, if the macro-instruction which has been fetched in advance to the instruction register 16 designates a start address which indicates, for example, the microprocess STPB1, the next address that is designated by the execution of common microprocess STPBC is directed to the microprocess STPB 3.

When the operation code branch field BRCF comprises of a plurality of bits as in this embodiment, the common microprocesses are allowed to exist in one microprocess flow in a number designated by the field BRCF or in a number of pages designated by the field BRCF. That is, when it is regarded that the start address of the macro-instruction is designated with the additional bits being, for example "000", the destination after the common microprocess is executed can be any one of seven determined by the additional three bits, i.e., "001" to "111".

The conditional branch processing such as the microprocess STPD 3 of FIG. 6 is executed as described below.

That is, the bits of the field CBIF of FIG. 5 and the flag data produced from the flag register set to the arithmetic execution unit 1 are supplied to a suitable logic circuit which modifies the next address that is supplied from the micro ROM 11. This determines which one of a plurality of branched processes STPD 4, STPD 5 should be executed.

According to this embodiment, the control unit 1 has several circuits for the DMA transmission as described earlier.

When the operation of the LSI is shifted to DMA transmission, a start address corresponding to a transmission mode set in the DMA control register 17 is supplied from the decoder 18 to the DMA ROM address register 14b through the multiplexer 15b. Then, it is supplied selectively to the address decoder 12 by the multiplexer 13, so that a first micro-instruction for DMA transmission is read out. Subsequently, in the same way as in the operation for CPU, a next address contained in the micro-instruction is held by the DMA ROM address register 14b through the multiplexer 15b, micro-instructions are read out successively, so that the DMA transmission is executed.

Here, though there is no particular limitation, the data written onto the DMA control register 17 or the data supplied to the decoder 18, consist of bits that are constructed as shown in Table 1.

TABLE 1

| | Bit number | | | | | | | |
|---|---|---|---|---|---|---|---|---|
| | 7 | 6 | 5 | 4 | 3 | 2 | 1 | 0 |
| Designation of bit | * | * | * | * | DM1 | DM0 | SM1 | SM0 |

In Table 1 above, bits DM1 and DM0 are regarded to indicate the mode of device on the destination side, and bits SM1 and SM0 are regarded to indicate the mode of device on the source side. The fourth to seventh bits marked with asterisk are non-reference bits.

A combination of two bits, i.e., bits DM1 and DM0, and a combination of two bits, i.e., bits SM1 and SM2, respectively designate the contents as shown in Table 2.

TABLE 2

| Bit condition | | |
|---|---|---|
| DM1 (SM1) | DM0 (SM0) | Content |
| 0 | 0 | Memory address increment |
| 0 | 1 | Memory address decrement |
| 1 | 0 | Memory address fixed |
| 1 | 1 | I/O address fixed |

According to Table 2 above, when the four bits DM1 o SM0 are set, for example, to "1100", the DMA transmission is designated so that the memory address of the ource side increases, and the address of the input/output device of the destination side is fixed.

The address decoder 18 of FIG. 2 decodes the thus oded DMA transmission control data, in order to form tart address data consisting of eight bits, that correpond to each of the DMA transmission control data.

Multiplexers 13, 15a and 15b are designed to be witched over by a control signal supplied by a control ircuit which receives as an input signal a part of a ontrol signal of the micro-instruction read from the nicro ROM 11 or a part of that control signal and another control signal.

In the construction of FIG. 2, though there is no articular limitation, the multiplexers 15a and 15b are ontrolled for their operation by a control signal 113 roduced from the micro ROM 11. When a series of nicro-instructions are to be successively read out reponsive to a macro-instruction that is fetched to the nstruction register 16, and when a series of micronstructions for the DMA transmission are to be succesively read out responsive to a decode signal supplied rom the decoder 18, the control signal 113 assumes a evel such that the multiplexers 15a, 15b will select the ext address data supplied from the micro ROM 11. The ontrol signal 113 further assumes a level such that the nultiplexers 15a, 15b will select the output of the intruction register 16 and the output of the decoder 18 vhen a new macro-instruction is to be executed succeeding the execution of a macro-instruction and when he DMA transmission control is to be newly initiated s a result of reading and executing a suitable micronstruction.

In FIG. 2, though there is no particular limitation, the ontrol unit 1 has an exchange control logic circuit 19 or controlling the switching between the CPU operaion and the DMA transmission operation. When the DMA transmission request signal REQ1 or REQ2 is enerated from the external unit such as unit 62 or 63 of IG. 1, the exchange control logic circuit 19 causes the egister 14a to hold the next address of micro-instrucion for the CPU operation, causes the register 14b to eceive a decode signal of the decoder 18, and further auses the multiplexer 13 to select the output of the gister 14b.

Though the internal construction is not diagramed, ie exchange control logic circuit 19 includes an input ircuit which receives DMA transmission request signals REQ1 and REQ2, a logic circuit which receives le DMA transmission request signals via the above iput circuit, and a signal 111 that indicates a bus right pen timing produced from the micro ROM 11, and /hich produces control signals 190, 191 and 192 at a ming determined by the signal 111 when at least either ne of the DMA transmission request signal REQ 1 or EQ 2 is generated, and a logic circuit which produces channel designation signal 193 that indicates DMA transmission request source responsive to DMA transmission request signals REQ 1, REQ 2, and signal 111.

When the DMA transmission request signal REQ 1 or REQ 2 is generated, the control signal 190 does not readily change responsive to the signal REQ 1 or REQ 2, but assumes the control level which causes the register 14a to hold the next address data for the CPU operation after the bus right open designation timing signal 111 is produced from the micro ROM 11.

When the DMA transmission request signals are generated, the control signal 191 assumes a control level which causes the register 14b to receive the data after the output of the decoder 18 is selected by the multiplexer 15b and the timing signal 111 is generated.

Likewisely, the control signal 192 is controlled for its timing of change by the timing signal 111.

According to this embodiment as described above, the timing signal 111 supplied to the exchange control logic circuit 19 is substantially regarded to be a designation signal that indicates whether the DMA transmission operation can be started or not.

The circuit of this embodiment receives the two DMA transmission request signals REQ 1 and REQ 2, and is hence capable of controlling the DMA transmission of two channels.

Though there is no particular limitation, the channel designation signal 193 produced from the exchange control logic circuit 19 is regarded to be a kind of a micro-instruction, and is supplied to the micro-instruction register 10 together with the micro-instruction that is read out from the micro ROM 11. The arithmetic execution unit 2 is provided with a plurality of registers as will be explained later in detail with reference to FIG. 7 for each of the channels for the purpose of DMA transmission for each of the channels. In the DMA transmission operation, the register of which channel will be accessed is determined by the channel designation signal 193.

When the channel designation signal 193 is regarded to be a micro-instruction as in this embodiment, the micro-instructions read out from the micro ROM 11 during the DMA transmission operation need not be distinguished for each of the channels of DMA. In other words, the micro-instruction can be commonly used for each of the channels. This constitution gives the effect that the capacity of the micro ROM 11 can be reduced.

Figure 3:
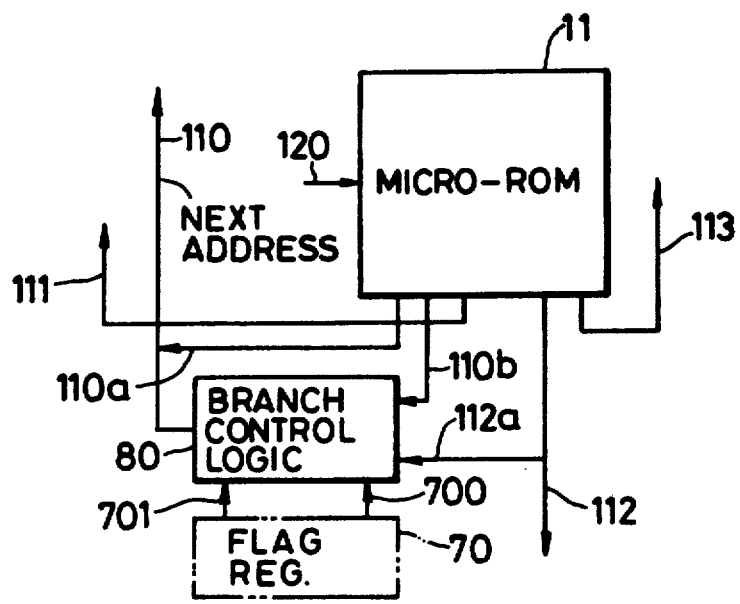
FIG. 3 is a block diagram showing the construction of the control unit in further detail.

FIG. 3 is a block diagram which illustrates in further detail the control unit which enables the conditional branch to be performed when the microprogram is being executed.

Among the next address data produced from the micro ROM 11, a data 112a that corresponds to the control field CBIF of FIG. 5 is supplied to a branch control logic circuit 80 which is further served with the output of a flag register 70 provided in the arithmetic execution unit 2.

The branch control logic circuit 80 modifies an address data 110b by making reference to the conditional branch control data supplied from the field CBIF of micro ROM 11 and to the flag data 700 to 701 supplied from the flag register 70. The address data modified by the branch control logic circuit 80 and the address data 110a corresponding to the field NAF of FIG. 5 produced from the micro ROM 11, are supplied as next address data 110 to the multiplexers 14a and 14b of FIG. 2.

Figure 7:
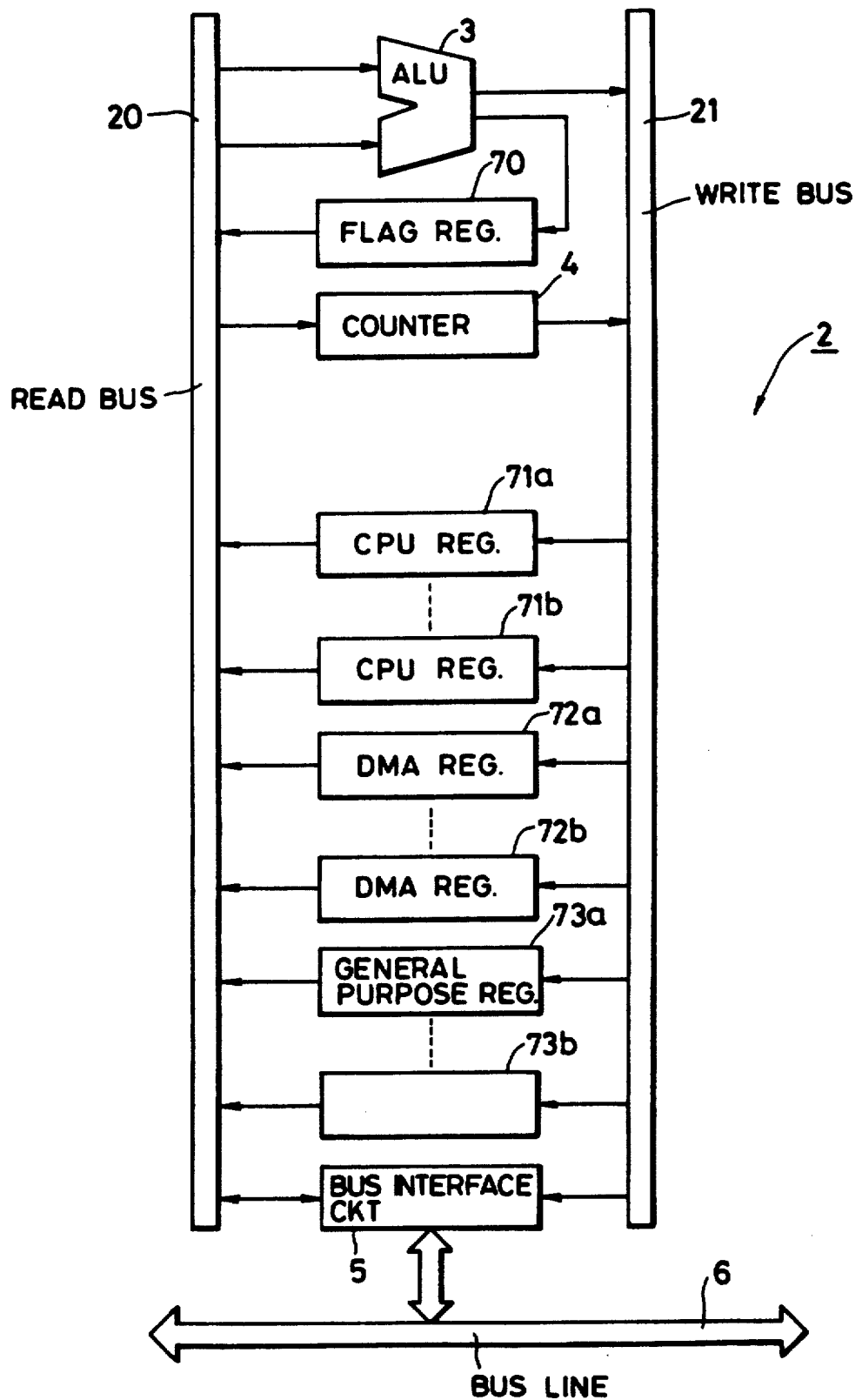
FIG. 7 is a block diagram which concretely illustrates an arithmetic execution unit.

FIG. 7 is a block diagram which concretely illustrates the arithmetic execution unit 2.

According to this embodiment, the arithmetic execution unit 2 comprises of registers 71a to 71b which exclusively participate in the CPU operation, registers 72a to 72b which exclusively participate in the DMA transmission operation, and various other circuits such as ALU 3, flag register 70, counter 4, general-purpose registers 73a to 73b, and bus interface circuit 5, that are commonly used for the CPU operation and the DMA transmission operation.

The registers 71a to 71b for CPU operation constitute, for example, accumulators, program counters and stack pointers.

The registers 72a to 72b for DMA transmission operation constitute source address registers, destination address registers, and transmission word number registers, that are provided for each of the DMA channels in a one-to-one manner.

A DMA source address data is set to each of the source address registers, and a DMA destination address data is set to each of the destination registers. The data that indicates the number of words to be transmitted is set to each of the transmission word number registers.

These circuits of the arithmetic execution unit 2 are provided between a read-only bus 20 and a write-only bus 21.

The ALU 3 receives the data to be operated from the circuits via the read-only bus 20, and sends the operated data to the write-only bus 21.

The flag register 70 receives a flag data formed by the ALU 3. According to this embodiment, though there is no particular limitation, the flag data produced from the ALU 3 is directly supplied to the flag register 70 without passing through the write-only bus 21. This constitution enables the circuit to operate quickly. The flag data of the flag register 70 is directly supplied to the branch control logic circuit 80 of FIG. 3, and is further allowed to be read out via the read-only bus 20.

The counter 4 is used for renewing the data of register for program counter and for renewing the data of registers for DMA.

The bus interface circuit 5 is coupled to the internal bus 6. Therefore, the data can be transmitted among the internal bus 6 and the buses 20, 21 in the arithmetic execution unit 2.

Though not specifically limited, the ROM 64 of FIG. 1 stores the preset data for the register for DMA in the arithmetic execution unit 2 and for the DMA control register 17 of FIG. 2. The data are preset to these registers for DMA by, for example, the CPU operation at the time of starting the system operation.

According to this embodiment, as described above, concentrated control of the CPU and the DMA can be performed by a single micro ROM, the regulation of logic can be attained, and the efficiency of logical design and control operations can be improved.

Figure 8:
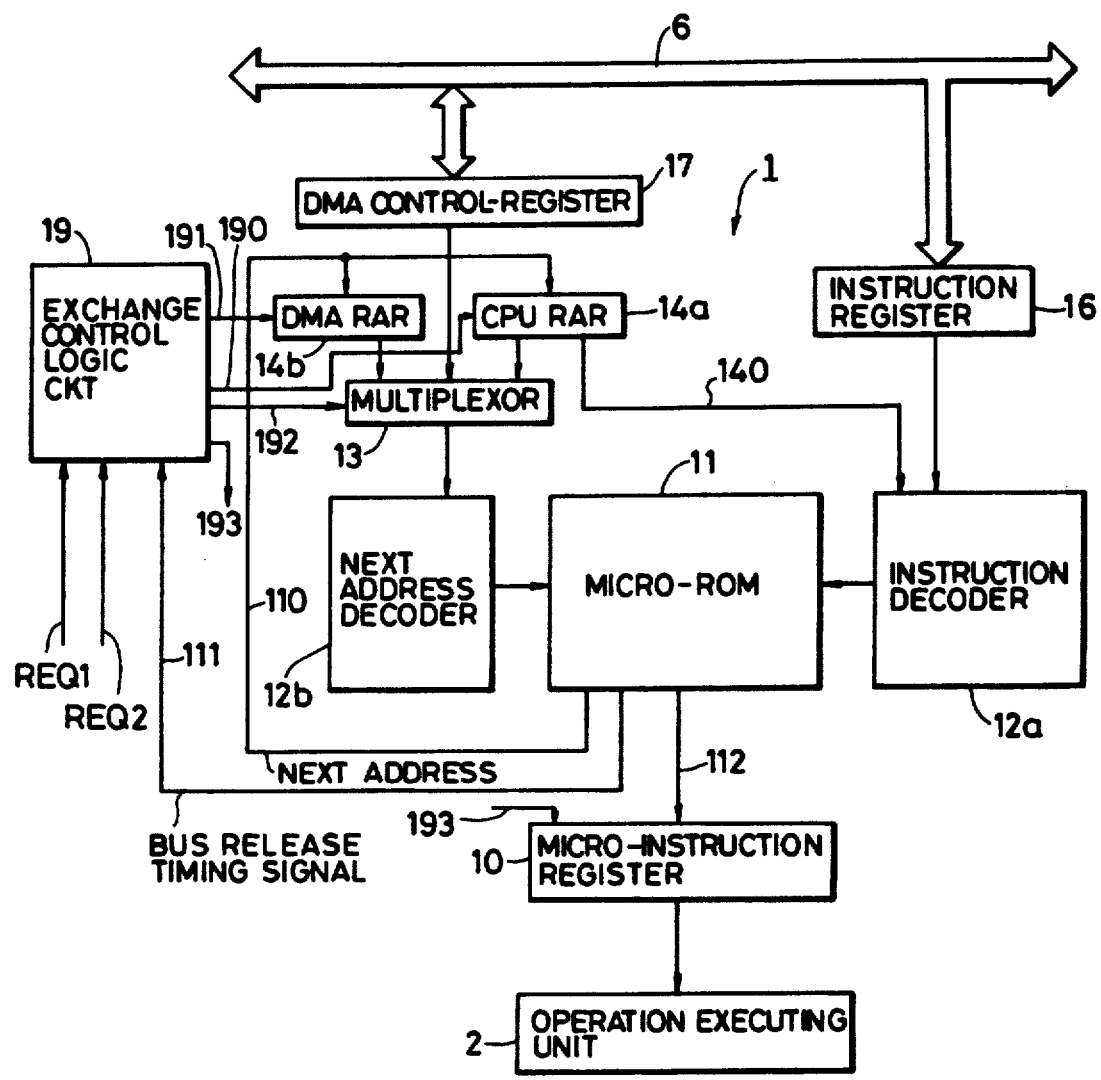
FIG. 8 is a block diagram showing another embodiment of the construction of the control unit.

FIG. 8 shows another embodiment of the construction of the above-described control unit 1.

The integrated decoder 12 for macrocommands and next addresses in the foregoing embodiment are separated into decoders 12a and 12b in the present embodiment, and the part of operation code of a macro-instruction fetched by an instruction register is put directly in the instruction decoder 12a, from which a first micro-instruction is read out. Moreover, an output signal of a DMA control register 17 determining a transmission mode is supplied directly to a multiplexer 13 which selectively passes addresses from the CPU ROM address register 14a and the DMA ROM address register 14b which hold said next addresses.

Furthermore, in the present embodiment, decoder 18 in the previous embodiment decodes the output signal of the DMA control register and forms a start address corresponding to a set transmission mode, is integrated with the address decoder 12b which decodes next addresses.

Though there is no particular limitation, output terminals of the decoders 12a and 12b are coupled to the word lines or address input lines of the micro ROM 11. Here, the decoders 12a and 12b are selectively operated so that the micro-instructions can be read out from the micro ROM 11 without competition between outputs of the two decoders 12a, 12b. As will be described later, the control signals for controlling the operation of decoders 12a, 12b are formed by the micro ROM 11.

Figure 9:
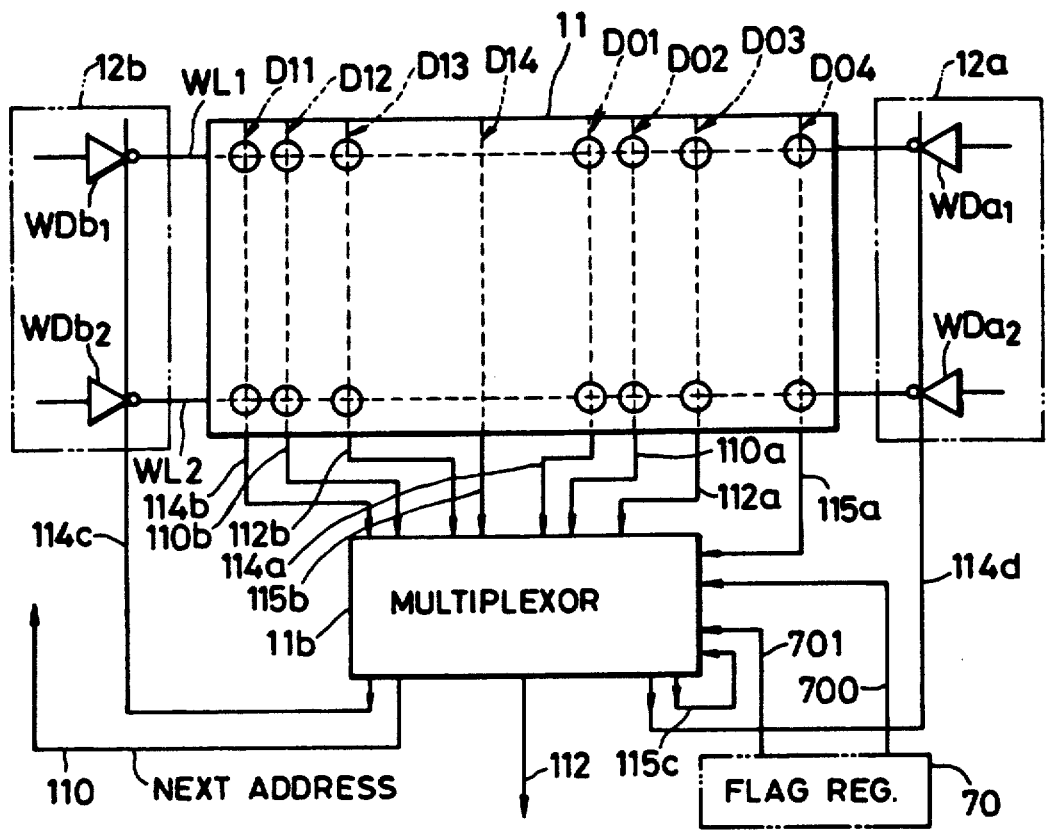
FIG. 9 is a block diagram which shows in further detail the construction of the control unit of FIG. 8.

FIG. 9 is a block diagram which concretely illustrates portions of the decoders 12a, 12b, the micro ROM 11, and a circuit connected thereto.

The decoders 12a, 12b have word line drive circuits $WD_{a1}$ to $WD_{a2}$ and $WD_{b1}$ to $WD_{b2}$ of which the output terminals are coupled to the word lines $WL_1$ to $WL_2$ of the micro ROM 11. Each word line drive circuit comprises of a circuit such as a so-called clocked inverter circuit whose output condition can be controlled.

Figure 10:
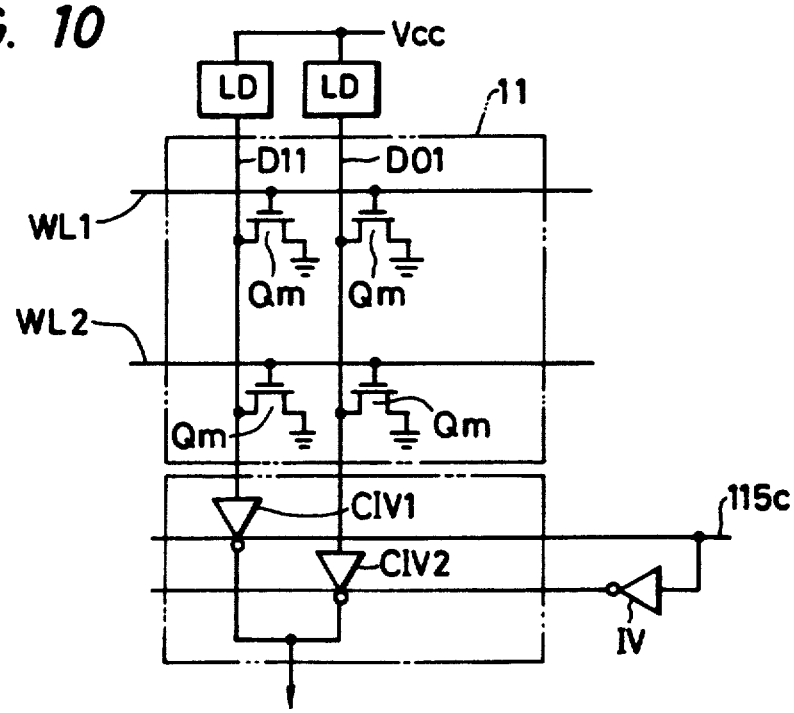
FIG. 10 is a diagram which concretely illustrates the circuit of a read-only memory.

The micro ROM 11 has a plurality of word lines WL1 to WL2, a plurality of data lines or bit lines D01 to D04 and D11 to D13, as well as a plurality of output determining elements or memory elements positioned at intersecting points of the word lines and the data lines. Each output determining element comprises, as shown, for example, in FIG. 10, of a MOSFET Qm of which the gate is connected to a word line and of which the source and drain are connected between a data line and a ground point of the circuit. Each MOSFET Qm has a threshold voltage which is greater than, or smaller than, the level of a data line that will be set when the MOSFET Qm is selected. A load element LD comprising of such as a MOSFET is coupled between each of the data lines and the power source terminal Vcc of the circuit to supply an operation potential to the data lines.

According to this embodiment, the micro ROM 11 is physically constituted as a single ROM. Theoretically, however, the micro ROM 11 is constituted by two ROM's. That is, the micro ROM 11 comprises of a first portion which includes data lines D01 to D04 that will be used when the decoder 12a is operated, and a second portion which includes data lines D11 to D14 that will be used when the decoder 12b is operated.

The micro ROM 11 produces from the first and second portions thereof control signals 114a and 114b to control the operation of word line drive circuits $WD_{a1}$ to $WD_{a2}$ and $WD_{b1}$ to of the decoders 12a, 12b, and further produces control signals 115a and 115b to control the operation of the multiplexer 11b.

Fundamentally, the multiplexer 11b is controlled for its operation by the control signals 115a and 115b supplied from the micro ROM, and selects the control signal or the micro-instruction supplied from the first and second portions of the micro ROM 11. If mentioned in further detail, the multiplexer 11b is controlled for its operation by a control signal 115c that is formed responsive to the control signal 115a and 115b. The level of the control signal 115c has been determined in advance by the control signal 115a or 115b that was selected in the receding operation sequence. As the micro-instruction is read out as described above, the control signal 115c assumes a level for selecting the succeeding micro-instruction.

Though not specifically limited, the micro ROM 11 is so constituted as to produce a plurality of address data that are to be branched at the time of conditional branch. The multiplexer 11b selects a branching address data depending upon flag data 700 to 701 produced from the flag register 70 in the arithmetic execution unit and a conditional branch control signal produced from the micro ROM 11.

According to this embodiment, the number of word lines required for the micro ROM 11 needs be smaller than the number of word lines required for the micro ROM 11 of the first embodiment. Below is considered the case where a micro ROM is constituted having a micro address number of about 300 to 400, each micro-instruction being comprised of about 40 bits. When the micro ROM has a plurality of word lines corresponded to the micro addresses in a one-to-one manner and data lines corresponded to micro-instruction bits, its pattern will become very oblong on a semiconductor substrate. With the micro ROM being oblong in shape, the corresponding address decoder will assume a pattern that is markedly elongated on a plane. The circuit having such markedly elongated pattern brings about problem in laying out circuits of other kinds and with regard to wiring lengths. In the case of the second embodiment, however, the micro ROM 11 and the decoders 12a, 12b are prevented from having extremely elongated patterns.

The control unit 1 of FIG. 8 has the exchange control logic circuit 19 like in the first embodiment.

When the DMA transmission request signal REQ 1 or REQ 2 is generated and when the bus right opening designation signal 111 is generated, the exchange control logic circuit 19 supplies a control signal 192 to the multiplexer 13 to select the output of the DMA control register 17 for only a predetermined clock period.

In this construction, the multiplexer 13 interrupts the outputs of the ROM address registers 14a and 14b immediately after the shift to DMA transmission and applies the output of the DMA control register 17 to the address decoder 12b. Then, a first micro-instruction for the DMA transmission is read out of the micro ROM 11, and a next address contained in this instruction is fetched by the DMA ROM address register 14b. Thereafter, a series of micro-instructions are read out successively by next addresses, so that the DMA transmission is executed.

The DMA operation control signals written onto the DMA control register 17 may have been coded as shown in Tables 1 and 2 described earlier. In this case, the circuit is so constituted that a coded 4-bit data produced from the DMA control register 17 immediately after the shift to DMA transmission and a 4-bit data of the address register 14b are selected by the multiplexer 13. Namely, the 4-bit data supplied from the address register 14b is regarded to be a data that designates the fundamental step of the microprogram, and the 4-bit data supplied from the DMA control register 17 is regarded to be a data that designates the detailed steps in the fundamental step.

In the construction of the control unit of the embodiment shown in FIG. 2 the multiplexers 13, 15a and 15b are provided in front and the rear of the ROM address registers 14a and 14b respectively, and this circuit arrangement causes disadvantages in that the logical structure is complicated, the number of gated steps is increased and the speed of operation is somewhat decreased. In contrast to this, the control unit of the embodiment shown in FIG. 8 has the advantage of high operating speed because it has fewer multiplexers.

The present embodiment is constructed to have two separate decoders. However, the size of the circuitry which these decoders add is not considerably different from that including the address decoder in FIG. 2.

Moreover, in this embodiment, a branch condition contained in the sequence control field of a micro-instruction containing a next address is supplied from the CPU ROM address register 14a to instruction decoder 12a so as to form a branch address together with the operation code of a macro-instruction, although the invention is not limited to this configuration. Accordingly, even when the same macro-instruction is fetched, different processes can be executed according to the state of the CPU, and micro-instructions can thus be made common, so as not to require an increase in the size of the micro ROM.

That is, the address register 14a supplies to the decoder 12a an address data 140 which is substantially equal to the 3-bit page data of the aforementioned first embodiment.

When a common microprocess is executed such as the micro process STPBC in the microprocess flow of FIG. 6, the decoder 12a is operated. The decoder 12a decodes the micro-instruction comprising of 8 bits and the data comprising of additional bits 140, and, as a result, selects a word line that corresponds to a return address of the micro ROM 11.

In the above-described embodiments, the operations of the CPU and the DMA are performed by using the arithmetic execution and a bus in a time-sharing manner; consequently, complete parallel processing of the CPU and the DMA is impossible. However, no extreme decrease in the speed of operation is caused thereby, because the time during which the CPU performs an internal operation while the DMA controller executes data transmission during parallel processing accounts for only a few percent of all cycles even in a conventional system having the construction in which the CPU and the DMA controller are separate from each other. Furthermore, the present embodiments enable the elimination of overhead time required for DMA transmission demand signals and acknowledge signals to be interchanged between chips (LSIs), which is required when the CPU and the DMA controller are formed of a multichip. In addition, the present embodiments have an advantage of enabling an increase in a signal speed as well as a reduction in chip size thereby improving the speed of processing of the entire system, compared with a construction in which the CPU and the DMA controller are formed separately on the same chip, which results in an increase in the delay time of a signal due to the increased length of signal lines for connection between blocks and a bus.

The above description refers to the embodiments having the construction in which the CPU and the DMA controller are integrated on the same chip. Note that a dynamic RAM refresh circuit may also be incorporated into an entity containing the functions of the CPU and the DMA controller, so as to be integrated with these functions.

The above description also refers to the embodiments in which the functions of the CPU and the DMA controller are provided on the same chip. Another construction may be adopted, in this connection, in which a circuit having a function of controlling peripheral devices, such as a hard-disk controller, if formed in place of the DMA controller or together with it on the same chip in such a manner that it uses the common arithmetic execution unit and the integrated control unit.

Since the arithmetic execution unit is used in common with the microprocessor and the DMA controller, and the microprogram system is employed to control these devices to permit the respective microprogram ROMs to be integrated, duplication of circuit components is eliminated, thereby improving the function of the microprocessor without greatly increasing the chip size, and also simplifying the construction of the microcomputer system.

The invention described above on the basis of the foregoing embodiments, is not limited, of course, to those embodiments, but is variously modifiable within a scope not departing from the gist of the principles described. While a microprogram control system is adapted for the control unit in the above-described embodiments, for instance, it is also possible to form the control unit of a random logic circuit with the arithmetic execution unit used in common.

In the above detailed description, the invention is described mainly with reference to the case in which CPU and the DMA controller, which is the field of utilization discussed in the background of the invention, are made to be on a single chip. This invention is not limited, of course, to this case, but it can be utilized for control LSIs in general, including the case where controllers for peripheral devices, such as the DMA controller or a the hard-disk controller, are made to be on a single chip.

We claim:

1. A monolithic integrated single device data processor controller, comprising:

a CPU;

A DMA controller;

memory means for storing in a plurality of addressable memory locations, a plurality of CPU and DMA instructions for individually, respectively, controlling the operation of the CPU and the DMA controller;

holding means for simultaneously holding DMA and CPU instruction addresses of selected ones of said memory locations;

a single operation execution unit for executing at different times both said CPU and DMA instructions stored in said selected ones of said memory locations;

means for addressing said memory means in a variable sequence with said CPU and DMA instruction addresses held by said holding means for transferring said CPU and DMA instructions from said selected ones of said memory locations addressed by said CPU and DMA instruction addresses to said operation execution unit;

means for transferring said DMA instruction address from said holding means to said means for addressing while simultaneously maintaining said CPU instruction address held within said holding means independently of the order of arrival of said DMA instruction address and said CPU instruction address in said means for holding; and means for transferring said CPU instruction address from said holding means to said means for addressing while simultaneously maintaining said DMA instruction address held within said holding means independently of the time of arrival of said DMA and CPU instruction addresses in said holding means.

2. The data processor controller of claim 1, wherein said memory means comprises a single storage element containing said plurality of addressable locations.

3. The data processor controller of claim 1, wherein data stored in said selected ones of said memory locations contain both said instructions and addresses of other ones of said plurality of memory locations, further comprising:

means for applying said addresses of said other ones of said plurality of said memory locations to said holding means.

4. The data processor controller of claim 2, wherein data stored in said selected ones of said memory locations contain both said instructions and addresses of other ones of said plurality of memory locations, further comprising:

means for applying said addresses of said other ones of said plurality of said memory locations to said holding means.

5. The data processor controller of claim 1, wherein data stored in said selected ones of said memory locations contain said instructions, addresses of other ones of said plurality of memory locations, and control signals, and wherein said addressing means is coupled to said memory means to respond to said control signals, whereby operation of said addressing means is controllable by said instructions stored in said selected ones of said memory locations.

6. The data processor controller of claim 2, wherein data stored in said selected ones of said memory locations contain said instructions, addresses of other ones of said plurality of memory locations, and control signals, and wherein said addressing means is coupled to said memory means to respond to said control signals, whereby operation of said addressing means is controllable by said instructions stored in said selected ones of said memory locations.

7. The data processor controller of claim 1, wherein said holding means comprises:

first decoder means for responding to reception of a mode signal by generating a start address for one of said selected ones of said memory locations corresponding to the mode signal;

first register means connectable to said decoder means for providing said start address as one of said selected addresses;

second register means for holding a macro-instruction and transferring an operation code included within said macro-instruction; and third register means connectable to said second register means for providing said operation code as one of said selected addresses.

8. The data processor controller of claim 7, wherein data stored in said selected ones of said memory locations contain both said instructions and addresses of other ones of said plurality of memory locations, further comprising:

switching means controllable by said instructions, interposed between said first decoder and said first register means, and between said second register means and said third register means, for selectively providing said start address, operation code and addresses of said other ones of said plurality of memory locations to respective ones of said first register means and said third register means.

9. The data processor controller of claim 8, wherein said addressing means includes multiplexing means for interrupting said addressing of said memory means with said selected addresses held by one of said first register means and said second register means.

10. The data processor controller of claim 5, wherein said holding means comprises:
first decoder means for responding to reception of a mode signal by generating a start address for one of said selected ones of said memory locations corresponding to the mode signal;
first register means connectable to said decoder means for providing said start address as one of said selected addresses;
second register means for holding a macro-instruction and transferring an operation code included within said macro-instruction; and
third register means connectable to said second register means for providing said operation code as one of said selected addresses.

11. The data processor controller of claim 10, wherein data stored in said selected ones of said memory locations contain both said instructions and addresses of other ones of said plurality of memory locations, further comprising:
switching means controllable by said instructions, interposed between said first decoder and said first register means, and between said second register means and said third register means, for selectively providing said start address, operation code and addresses of said other ones of said plurality of memory locations to respective ones of said first register means and said third register means.

12. The data processor controller of claim 11, wherein said addressing means includes multiplexing means for interrupting said addressing of said memory means with said selected addresses held by one of said first register means and said second register means.

13. The data processor controller of claim 1, wherein said holding means comprises:
control register means for providing a mode signal directly to said addressing means;
first register means connectable to said addressing means for sequentially holding a first plurality of said addresses to said memory locations; and
second register means connectable to said addressing means for sequentially holding a second plurality of said addresses to said memory locations;
whereby said addressing means is enabled to address said memory means with selected ones of said mode signal, and said first and second pluralities of said addresses.

14. The data processor controller of claim 13, wherein said addressing means comprises:
first decoder means for applying said mode signal, and said first and second pluralities of addresses to address said memory locations; and
first switching means interposed between said first decoder and said control register, first register means, and second register means;
whereby said addressing means is enabled to selectively address said memory locations in correspondence to said mode signal, and said first and second pluralities of addresses.

15. The data processor controller of claim 5, wherein said holding means comprises:
control register means for providing a mode signal directly to said addressing means;
first register means connectable to said addressing means for sequentially holding a first plurality of said addresses to said memory locations; and
second register means connectable to said addressing means for sequentially holding a second plurality of said addresses to said memory locations;
whereby said addressing means is enabled to address said memory means with selected ones of said mode signal, and said first and second pluralities of said addresses.

16. The data processor controller of claim 15, wherein said addressing means comprises:
first decoder means coupled to said first and second register means, for applying said mode signal, and said first and second pluralities of addresses to address said memory locations; and
first switching means interposed between said first decoder and said control register, first register means, and second register means;
whereby said addressing means is enabled to selectively address said memory locations in correspondence to said mode signal, and said first and second pluralities of addresses.

17. The data processor controller of claim 13, wherein said addressing means comprises:
first decoder means for applying said mode signal and said first and second pluralities of said addresses to selectively address said memory locations; and
second decoder means for receiving operation codes and addressing corresponding ones of said memory locations within said memory means with addresses corresponding to said operation code, in selective alternative succession to said first decoder.

18. The data processor controller of claim 17, wherein said selected memory locations contain branch conditions, further comprising:
means for providing said branch conditions to said second decoder means in conjunction with said operation code.

19. The data processor controller of claim 15, wherein said addressing means comprises:
first decoder means coupled to said first and second register means, for applying said mode signal and said first and second pluralities of said addresses to selectively address said memory locations; and
second decoder means for receiving operation codes and addressing corresponding ones of said memory locations within said memory means with addresses corresponding to said operation code, in selective alternative succession to said first decoder.

20. The data processor controller of claim 17, wherein said selected memory locations contain branch conditions, further comprising:
means for providing said branch conditions to said second decoder means in conjunction with said operation code.

21. A microprocessor formed on a semiconductor substrate, comprising:
operation execution means for executing instructions;
memory means for storing a plurality of micro-instructions therein, said plurality of micro-instructions including first micro-instructions for executing a predetermined instruction which has a predetermined start address, and a second micro-instruction for executing DMA transmission, wherein said first micro-instructions includes an address field containing next address data for indicating a next address at which a micro-instruction to be subsequently read out from said memory means is stored, and a control field for controlling said operation execution means;

address providing means coupled to said memory means and including first means responsive to said predetermined instruction for providing said predetermined start address, storing means for storing the next address data in said predetermined first micro-instruction read out from said memory means, second means responsive to a request signal for providing DMA address data for indicating said second micro-instruction, and control means coupled to said storing means and to said second means for providing said DMA address data instead of said next address data in response to said request signal;

said operation execution means including means for executing said first and second micro-instructions;

said control means including switching circuit means having input terminals coupled to receive said next address data and to receive the DMA address data, respectively, and an output terminal coupled to said memory means; and said switching circuit providing the DMA address data upon receipt of said request signal.

22. A microprocessor according to claim 21, wherein said control means further includes a control circuit having input terminal means for receiving said request signal, said control circuit further providing at an output terminal thereof a control signal for controlling said switching means.

23. A microprocessor according to claim 21, wherein said control means supplies said next address data that is stored in said storing means, at a time when said DMA address data is supplied to said memory means, to said memory means after completion of said DMA transmission so as to completely execute said instruction.

24. The data processor controller according to claim 1, wherein said means for holding includes a DMA instruction address register and a separate CPU instruction address register.

25. The data processor according to claim 24, wherein said means for transferring includes switching circuit means having input terminals respectively coupled to receive said CPU instruction address and said DMA instruction address, a single output terminal coupled to said memory means, and being responsive to receipt of a DMA request signal for providing the DMA instruction address to said address means instead of said CPU instruction address.

26. The data processor controller according to claim 25, wherein said memory means is a single ROM; said operation execution unit includes an ALU, interface and counter commonly shared by said CPU and said DMA controller; and said addressing means is an address decoder.

27. The data processor controller according to claim 26, including separate DMA and CPU multiplexers respectively outputting CPU instruction addresses and DMA instruction addresses to said DMA address register and said CPU address register.

an internal bus interconnecting said memory means and said operation execution unit; and said DMA and CPU multiplexers each having two instruction address inputs respectively connected to receive the next addresses from said memory means and the internal data bus.

28. The data processor controller of claim 1, wherein said means for transferring includes switching circuit means having input terminals respectively coupled to receive said CPU instruction address and said DMA instruction address, a single output terminal coupled to said memory means, and being responsive to receipt of a DMA request signal for providing the DMA instruction address to said address means instead of said CPU instruction address.

29. The data processor controller according to claim 28, including separate DMA and CPU multiplexers respectively outputting CPU instruction addresses and DMA instruction addresses to said DMA address register and said CPU address register, an internal bus interconnecting said memory means and said operation execution unit; and said DMA and CPU multiplexer each having two instruction address inputs respectively connected to receive the next addresses from said memory means and the internal data bus.

* * * * *